United States Patent

Holmes et al.

[15] 3,704,934
[45] Dec. 5, 1972

[54] LASER POLARIZING BEAM SPLITTER

[72] Inventors: Samuel J. Holmes, Santa Monica; Frank Joseph Woodberry, Playa Del Ray, both of Calif.

[73] Assignee: Union Carbide Corporation, New York, N.Y.

[22] Filed: Aug. 16, 1971

[21] Appl. No.: 172,130

[52] U.S. Cl. ............... 350/152, 350/147, 350/157, 350/164, 350/169
[51] Int. Cl. ............................................. G02b 27/28
[58] Field of Search...... 350/147, 152, 157, 164, 166, 350/169, 172, 173; 260/653; 106/190; 331/94.5

[56] References Cited

UNITED STATES PATENTS

| | | | |
|---|---|---|---|
| 3,487,230 | 12/1969 | Costich | 307/88.3 |
| 3,552,823 | 1/1971 | Badoz et al. | 350/157 |

*Primary Examiner*—David Schonberg
*Assistant Examiner*—Paul R. Miller
*Attorney*—Pastoriza & Kelly

[57] ABSTRACT

The beam splitter comprises first and second prisms having diagonal surfaces placed together in juxtaposed relationship with means on the opposing edge portions of the surfaces holding the surfaces in spaced relationship to define a thin chamber therebetween. A fluorinated hydro-carbon liquid fills this chamber and one diagonal surface is provided with a multi-layered di-electric coating. High reflectance is provided for the S component of a laser beam and high transmittance for the P component for both ruby and neodymium laser wave lengths of 0.694 and 1.06 microns respectively. The use of the liquid interface avoids the necessity of cement or glue to hold the prisms together so that the beam splitter may be used with high power laser beams without the risk of deterioration.

4 Claims, 4 Drawing Figures

PATENTED DEC 5 1972 3,704,934

3,704,934

LASER POLARIZING BEAM SPLITTER

This invention relates generally to optical devices utilized in laser systems and more particularly to an improved laser polarizing beam splitter particularly useful in laser applications involving high power density laser beams.

BACKGROUND OF THE INVENTION

Polarizing beam splitters are well known in the art and in general function to provide a high transmittance for the P component of laser light and a high reflectance for the S component. Heretofore, one type of beam splitter has taken the form of a pair of prisms having their diagonal surfaces cemented together with a suitable multi-layer dielectric coating on one of the surfaces. However, at high power densities, for example, in excess of 100 megawatts per square centimeter any cement or glue utilized in the optical device deteriorates and the device itself is useless.

In many instances, calcite crystal is utilized in forming the beam splitter. However, this material is very expensive and difficult to provide in large sizes. As a consequence, calcite type beam splitters are limited to applications in which the laser beam is of relatively small cross-sectional area.

Finally, the types of beam splitters presently available are generally designed for a specific wave length, for example, a ruby laser wave length of 0.694 microns or a neodymium laser wave length of 1.06 microns. As a result, individual beam splitters must be utilized with individual lasers. It would be advantageous in certain laser systems to provide a beam splitter which would operate equally well for both ruby and neodymium wave lengths.

BRIEF DESCRIPTION OF THE PRESENT INVENTION

With the foregoing considerations in mind, the present invention contemplates an improved laser polarizing beam splitter in which various disadvantages as discussed above with presently available beam splitters are overcome.

More particularly, the beam splitter of the present invention comprises first and second prisms having diagonal surfaces placed together in juxtaposed relationship. Rather than cementing or gluing the surfaces together, there is provided a means on the opposing edge portions of the diagonal surfaces holding the surfaces in spaced relationship to define a thin chamber therebetween. A multi-layer dielectric coating is provided on one of the diagonal surfaces designed to assure high reflectance for the S component and high transmittance for the P component. The chamber itself is filled with a fluorinated hydro-carbon liquid having a matching index of refraction with the prisms which might constitute glass.

With the foregoing arrangement, there is no cement or glue in the path of the laser beam and thus problems associated with high power density beams and cement or glue deterioration are avoided. Further, the use of glass prisms with the fluorinated hydro-carbon liquid places no limitation on the size of the beam splitter so that the device finds wide application even for laser systems having high cross-sectional area beams. Moreover, the splitter is economical to manufacture even in large sizes as compared to calcite type splitters.

The multi-layer dielectric filter provides excellant separation of the beam components over a wide band of wave lengths including both the wave lengths for ruby and neodymium lasers and thus a single beam splitter made in accord with the present invention may be utilized in either laser system.

BRIEF DESCRIPTION OF THE DRAWINGS

A better understanding of the invention will be had by now referring to the accompanying drawings in which.

DETAILED DESCRIPTION OF THE PREFERRED EMBODIMENT

Figure 1:
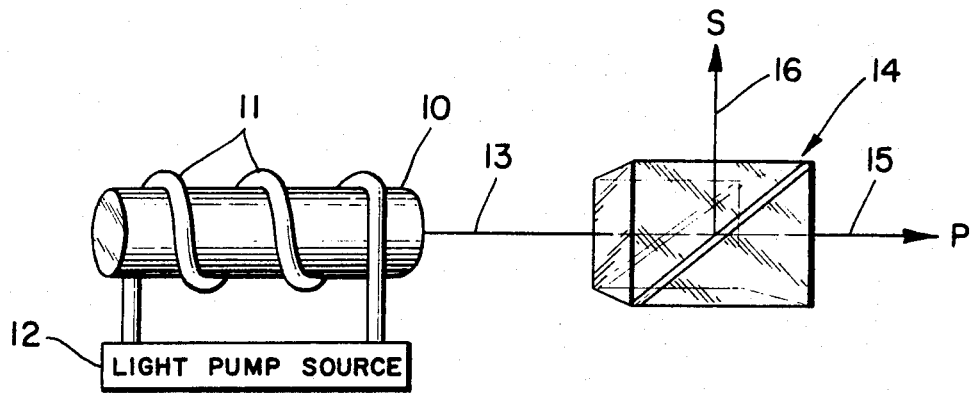
FIG. 1 diagrammatically illustrates a typical laser which might be a ruby or neodymium laser with the polarizing beam splitter disposed in the laser beam path for separating components of the light in accord with the present invention.

Referring first to FIG. 1 there is diagrammatically indicated a laser medium 10 surrounded by a helical flash lamp 11 powered from a light pump source 12. Suitable end mirrors may be provided on the end of the laser medium 10 as by applying appropriate coatings or spaced end mirrors may be employed. The showing in FIG. 1 is purely diagrammatic and the particular light pump and laser medium configuration is merely by way of example. The laser medium itself may constitute ruby or a neodymium doped medium.

The laser beam is depicted by the line 13 and as shown passes through a laser polarizing beam splitter 14 designed in accord with the present invention. The beam splitter serves to separate out the P and S components of light as indicated at 15 and 16.

Figure 2:
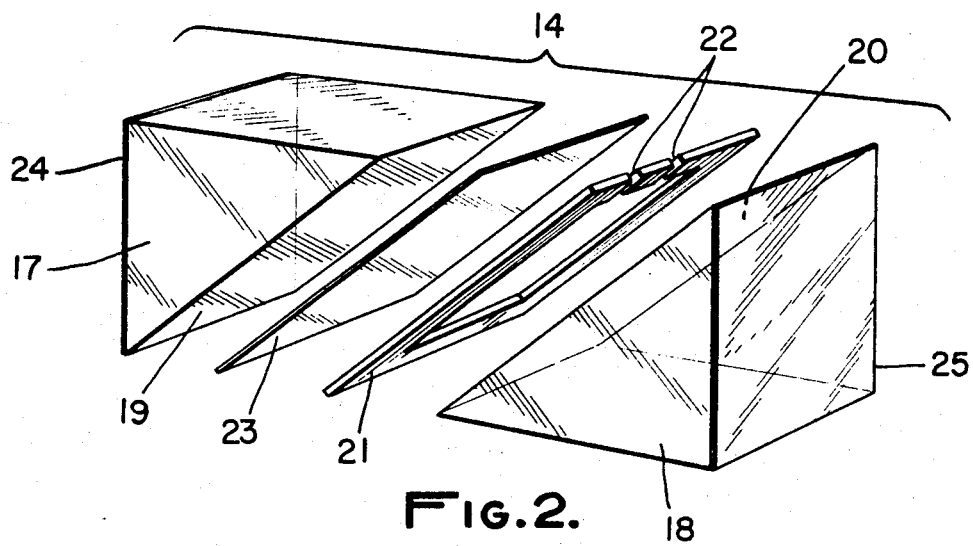
FIG. 2 is an exploded perspective view of elements making up the beam splitter shown in FIG. 1.

Referring now to FIG. 2, it will be noted that the beam splitter 14 is made up of first and second prisms 17 and 18 which may constitute glass. As a convenience in manufacturing, these prisms are preferably right angle prisms and include diagonal surfaces 19 and 20 arranged to be positioned in juxtaposed relationship to define generally a cube shape. Means are provided on the opposing edge portions of the diagonal surfaces to hold them in spaced relationship. In FIG. 2, this means is shown exploded away from the surfaces at 21 and may comprise a thin material affixed to the edges of the diagonal surfaces in the form of a strip such, for example, as MYLAR. Small gaps or openings are left at 22. A multi-layer dielectric coating 23 in turn is provided on one of the diagonal surfaces but in FIG. 2 is shown exploded away from the surface. Suitable anti-reflection coatings 24 and 25 are provided on those surfaces in which the laser beam will enter and exit.

Figure 3:
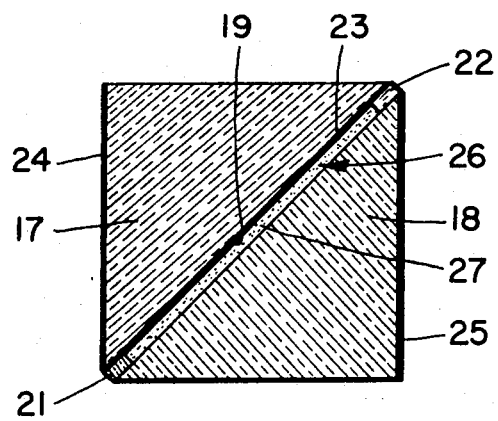
FIG. 3 is an assembled cross-section of the beam splitter.

Referring now to FIG. 3 the prisms 17 nd 18 are shown in assembled relationship wherein it will be noted that the spacing strip 21 defines a thin chamber between the opposed diagonal surfaces as indicated at 26. The thickness of this chamber is determined by the thickness of the strip material which may vary between 0.1 and 0.3 mils. In FIG. 3 it will be noted that the multi-layer dielectric coating 23 is provided on the diagonal surface 19 for the prism 17.

In accord with the present invention, the thin chamber 26 is filled with a liquid through the openings 22 which are thereafter sealed. This liquid constitutes a flourinated hydro-carbon and a typical designation in FC-77 from DuPont.

The thickness of the multi-layers making up the dielectric coating 23 are such that high reflectance and high transmittance for the S and P components of laser light result. Further, these properties obtain over a relatively wide band.

Figure 4:
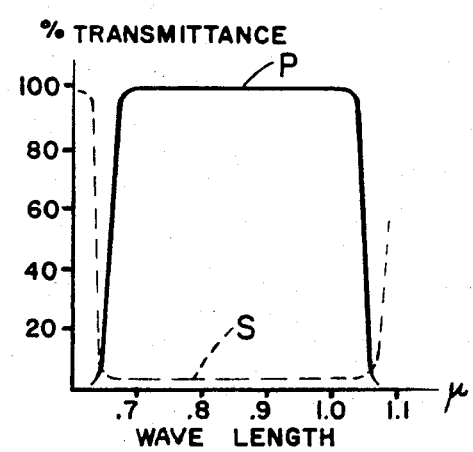
FIG. 4 is a qualitative curve illustrating the transmittance characteristics of the beam splitter over various wave lengths.

Thus, referring to FIG. 4 there is shown a transmittance curve P indicating the per cent transmittance for this component over wave lengths ranging from about 0.6 microns to 1.1 microns. It will be noted that there is provided very high transmittance for the P component, greater than 99 percent between the wave lengths of 0.690 microns and 1.060 microns.

The dotted curve S illustrates the rejection of this component to straight transmission through the coating. Thus, the reciprocal of this curve would indicate the per cent reflectance which over the wave length depicted between 0.690 microns and 1.060 microns is greater than 99 percent.

Multi-layer dielectric coatings are well known in the art to provide high transmittance and reflectance over the various wave lengths. The particular multi-layer dielectric coating used in the present invention does not, per se, constitute the present invention. It is only such a coating in combination with the prism members, defined chamber, and liquid disposed therein that results in an improved optical beam splitter. However, by way of example the multi-layer dielectric coating may comprise fifteen layers of approximately one quarter wave length thickness at a medium wave length of 0.850 microns of high and low index material such as cerium oxide and magnesium fluoride alternately applied. Suitable matching layers are provided at the interfaces.

OPERATION

The use of the fluorinated hydro-carbon liquid between the opposed diagonal surfaces of the prisms serves as a substitute for conventional glue or cement which latter substance would be destroyed under high power densities. Thus when the beam 13 of FIG. 1 passes into the cube shaped beam splitter reflections are induced to interfere constructively such that there is high transmittance for the P component and high reflectance for the S component. As stated, the properties are such that greater than 99 percent of the P component passes through the cube and greater than 99 percent of the S component is reflected out.

By utilizing glass prisms assembled as described with the liquid interface, there is no practical limitation on the size of the beam splitter so that the same may be utilized with large cross-sectional laser beams. Further, and as mentioned heretofore the design is such as to operate effectively at either ruby or neodymium wave lengths so that a single beam splitter will serve in both systems. Finally, the particular beam splitter described is relatively economical to manufacture and serves as a substitute for the calcite beam splitters which relied on birefringence and which are very expensive.

From the foregoing description, it will thus be evident that the present invention has provided an improved laser polarizing beam splitter overcoming various problems heretofore associated with prior art devices performing equivalent functions.

What is claimed is:

1. A laser polarizing beam splitter comprising, in combination: first and second prisms having diagonal surfaces placed together in juxtaposed relationship; means on the opposing edge portions of the diagonal surfaces holding said surfaces in spaced relationship to define a thin chamber therebetween; a multi-layer dielectric coating on one of said diagonal surfaces providing high reflectance for the S component of a laser beam and high transmittance for the P component; and a fluorinated hydro-carbon liquid filling said chamber.

2. A beam splitter according to claim 1, in which said means on the opposing edge portions comprises a thin strip of material cemented to the edge portions, the thickness of said strip being from 0.1 to 0.3 mils and defining the thickness of said chamber.

3. A beam splitter according to claim 1, in which said prisms are right angled such that placing of the diagonal surfaces in juxtaposed relationship generally defines a cube, the laser beam entrance and exit surfaces of said cube having anti-reflection coatings.

4. A beam splitter according to claim 1, in which the thicknesses of the multi-layers making up said dielectric coating are such that said high reflectance and high transmittance properties are greater than 99 percent for laser wave lengths of from 0.690 microns to 1.060 microns.

* * * * *